G. A. FELDKAMP.
TIRE.
APPLICATION FILED FEB. 5, 1921.
1,413,714. Patented Apr. 25, 1922.
2 SHEETS—SHEET 1.
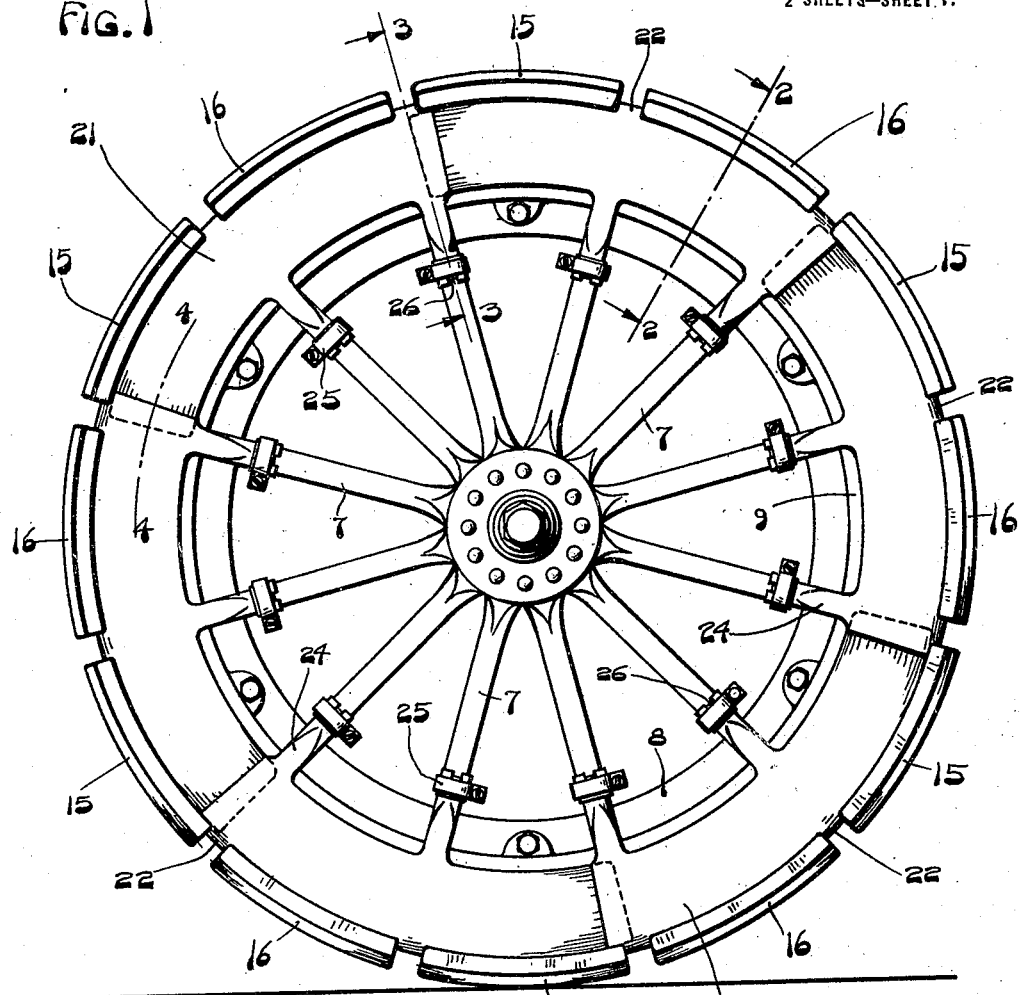
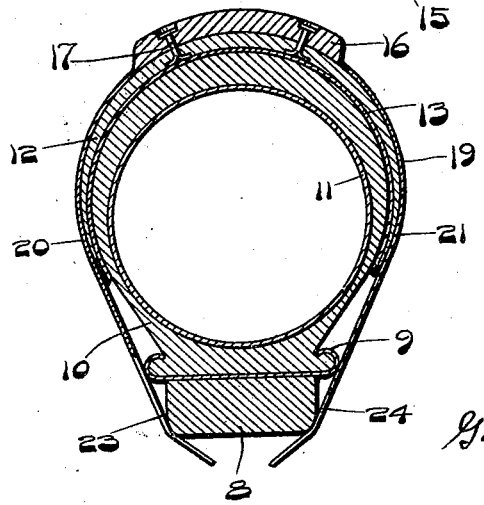
INVENTOR
George A. Feldkamp

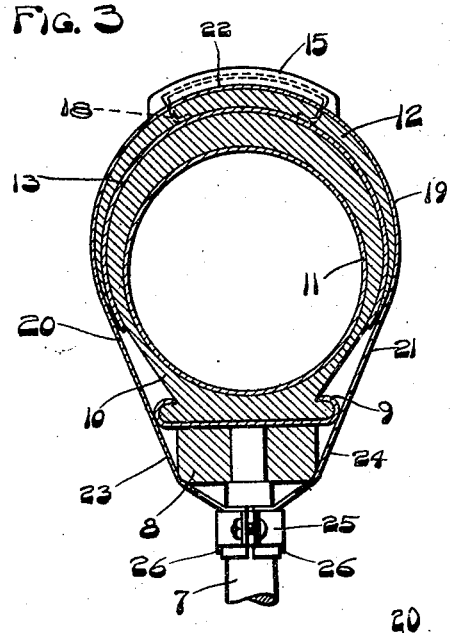
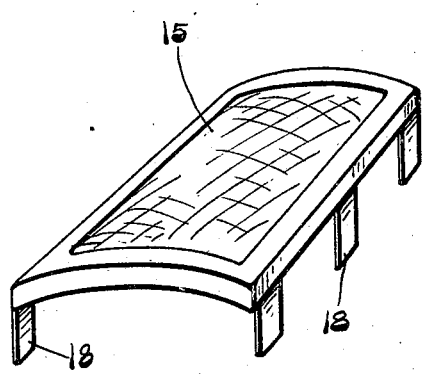
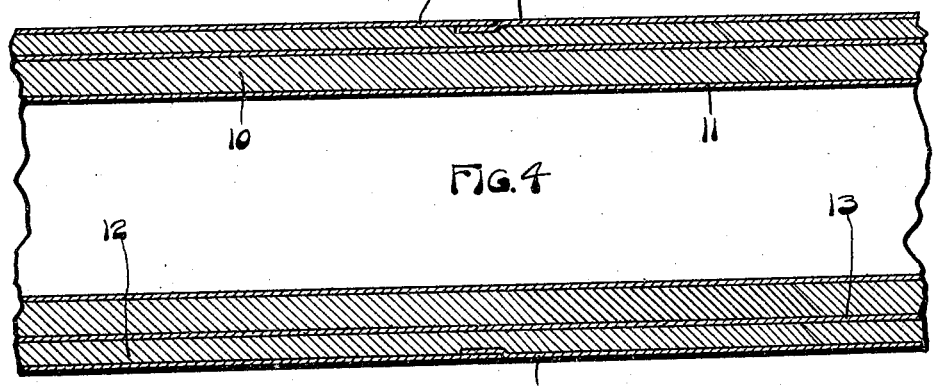
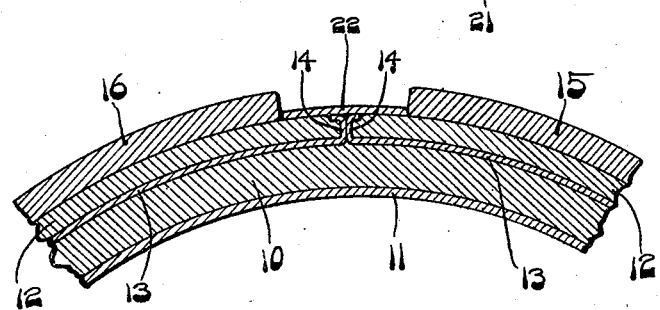

UNITED STATES PATENT OFFICE.

GEORGE A. FELDKAMP, OF CINCINNATI, OHIO.

TIRE.

1,413,714.  Specification of Letters Patent.  Patented Apr. 25, 1922.

Application filed February 5, 1921. Serial No. 442,822.

*To all whom it may concern:*

Be it known that I, GEORGE A. FELDKAMP, a citizen of the United States, residing in Cincinnati, in the county of Hamilton and State of Ohio, have invented new and useful Improvements in a Tire, of which the following is a specification.

This invention has for an object to produce a vehicle tire of the armored or reinforced pneumatic type which the tread elements alone are exposed to wear and are renewable, the remaining portions or tire proper being protected from wear and puncture by reinforcements which will be described fully hereinafter.

In the drawings:

Fig. 1 is an elevation of a vehicle wheel equipped with a tire embodying my invention.

Fig. 2 is an enlarged transverse sectional view taken on the line 2—2 of Fig. 1.

Fig. 3 is an enlarged transverse sectional view taken on the line 3—3 of Fig. 1.

Fig. 4 is an enlarged fragmental longitudinal sectional view taken on the line 4—4 of Fig. 1.

Fig. 5 is an enlarged perspective view of a tread element embodying a detail of my invention.

Fig. 6 is an enlarged fragmental sectional view taken on the line 6—6 of Fig. 2.

The basis upon which the tire embodying my invention is built up, consists of the usual vehicle wheel 7 having a felly 8 upon which the general clincher rim 9 is mounted for carrying the well known clincher type of tire 10 in which an inner tube 11 is located for inflation in the usual manner.

Upon this tire is located an annular boot or shoe 12 which is formed in sections and extends around the tire proper, its edges terminating adjacent to the clincher rim 9. Between the boot and tire proper is a sheet metal protection or inner armor 13 which is held in place in sections, each section of armor on one section of boot, by having its ends 14 bent to clinch the ends of the boot sections as shown in Fig. 6. Upon each boot section I preferably secure two tread elements 15 and 16 which are of rubber and fabric like the shoe sections and tire proper. The manner in which these elements may be secured to the boot sections may be as shown in Fig. 2, in which clinch pins 17 are used, or they may be secured by means of lugs 18 extending from the edges of the tread element as shown in Fig. 5, and clinched through the boot as shown in Fig. 3. In fact the tread element may be vulcanized to the boot or be made an integral part thereof instead of clinched to the boot, if desired.

The ends of the boot sections abut and the joints between them are covered by outer armor sections 19 which have sides 20 and 21 connected by strap portions 22 located between the tread elements. The ends of the sides 20 and 21 are left longer than required so that they overlap as shown in Figs. 1 and 4. From the edges of the sides adjacent to the clincher rim 9, strap like extensions 23 and 24 are provided at the middle and one end of each side, in pairs for cooperation with a spoke located between the straps of each pair to retain the construction in position on the wheel. The manner of securing the strap ends to the cooperating spoke consists in bending the strap ends to substantially encircle the spoke adjacent to the felly. A clamp 25 is then placed upon the split and upturned ends of the strap 23 and 24 and the bolt thereof drawn up tight to clamp the strap ends to the spoke. To prevent displacement of the clamp I turn up lugs 26 from the ends of the straps and bend them against the clamp as shown in Figs. 1 and 3.

Thus my improved construction is secured to a vehicle wheel having the usual pneumatic tire thereon, and the tread thereof is protected thoroughly against puncture without sacrificing its resiliency, the sides being kept from chafing by the metal sides 20 and 21 of the armor.

Should the tread elements wear away and require replacement it is easy to do so by any of the fastenings described.

Having thus described my invention what I claim is:—

In combination with a vehicle wheel having a pneumatic tire thereon, an inner armor of sheet metal covering the tread and sides of the tire in a series of sections, a boot covering the inner armor in a series of sections and having one section of the inner armor secured at its ends to each boot section, tread elements spaced apart integral with or secured to each boot section, an outer sheet metal armor covering the boot sections and having overlapping ends, one section of outer armor to each section of boot, each outer armor section having openings therein for the protrusion and movement therethrough of the tread elements, strap-like extensions formed integrally with and extending from the outer armor sections for attachment to the spokes, and clamps to secure the extensions to the spokes.

In witness whereof, I affix my signature in the presence of two witnesses.

GEORGE A. FELDKAMP.

Witnesses:
CHARLES BAUMANN,
FREDERICK WALTHARD.